United States Patent
Trachtman

(10) Patent No.: US 10,152,245 B1
(45) Date of Patent: Dec. 11, 2018

(54) STORAGE MANAGEMENT SYSTEM AND METHOD

(71) Applicant: EMC CORPORATION, Hopkinton, MA (US)

(72) Inventor: Michael Trachtman, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 39 days.

(21) Appl. No.: 14/979,950

(22) Filed: Dec. 28, 2015

(51) Int. Cl.
*G06F 3/06* (2006.01)

(52) U.S. Cl.
CPC ........... *G06F 3/0619* (2013.01); *G06F 3/065* (2013.01); *G06F 3/067* (2013.01); *G06F 3/0653* (2013.01); *G06F 3/0659* (2013.01)

(58) Field of Classification Search
CPC ............... G06F 3/0653; G06F 2201/81; G06F 2201/87; G06F 2201/88; G06F 3/065; G06F 11/3034
See application file for complete search history.

(56) References Cited

U.S. PATENT DOCUMENTS

| | | | | |
|---|---|---|---|---|
| 8,856,400 B1* | 10/2014 | Davidson | ............... | G06F 3/0617 710/17 |
| 2002/0073290 A1* | 6/2002 | Litvin | .................. | G06F 3/0611 711/170 |
| 2006/0117138 A1* | 6/2006 | Suzuki | ...................... | C02F 1/68 711/114 |
| 2012/0023219 A1* | 1/2012 | Nagai | .................. | G06F 3/0605 709/224 |
| 2012/0066439 A1* | 3/2012 | Fillingim | ............ | G06F 11/3485 711/103 |

\* cited by examiner

*Primary Examiner* — Edward J Dudek, Jr.
*Assistant Examiner* — Andrew Russell
(74) *Attorney, Agent, or Firm* — Brian J. Colandreo; Mark H. Whittenberger; Holland & Knight LLP

(57) ABSTRACT

A method, computer program product, and computing system for defining at least a portion of a storage system as a data storage space. A rate limit is assigned to the data storage space, thus defining a default rate limit. Operations performed on objects within the data storage space are compared to determine if the default rate limit is exceeded. If the default rate limit is exceeded, one or more remedial actions are implemented concerning the operations performed on objects within the data storage space.

21 Claims, 4 Drawing Sheets

STORAGE MANAGEMENT SYSTEM AND METHOD

TECHNICAL FIELD

This disclosure relates to storage systems and, more particularly, to systems and methods for managing data.

BACKGROUND

Storing and safeguarding electronic content is of paramount importance in modern business. Accordingly, large storage systems may be utilized to protect such electronic content. As would be expected, such large storage systems may be complex in nature and may have multiple users that are creating and deleting data objects within these large storage systems. Unfortunately, such use and administration of these large storage systems by multiple users may result in complications concerning the management of these data objects.

SUMMARY OF DISCLOSURE

In one implementation, a computer-implemented method is executed on a computing device and includes defining at least a portion of a storage system as a data storage space. A rate limit is assigned to the data storage space, thus defining a default rate limit. Operations performed on objects within the data storage space are compared to determine if the default rate limit is exceeded. If the default rate limit is exceeded, one or more remedial actions are implemented concerning the operations performed on objects within the data storage space.

One or more of the following features may be included. The default rate limit may define one or more of: a maximum number of objects per unit time; and a maximum quantity of data per unit time. The remedial action may include one or more of: stopping an operation that exceeds the default rate limit; requesting user confirmation concerning the operation that exceeds the default rate limit; requesting supervisor authorization concerning the operation that exceeds the default rate limit; and slowing the operation that exceeds the default rate limit. Comparing operations performed on objects within the data storage space to the default rate limit to determine if the default rate limit is exceeded may include comparing a plurality of discrete operations performed on objects within the data storage space to the default rate limit to determine if the default rate limit is exceeded. The operations performed on objects within the data storage space may include one or more of: data object deletion operations; data object migration operations; data object modification operations; data object creation operations; data object copying operations; and data object archiving operations. A user of the data storage space may be enabled to override the default rate limit, thus defining an overridden rate limit. The default rate limit may be reestablished after a defined period of time.

In another implementation, a computer program product resides on a computer readable medium and has a plurality of instructions stored on it. When executed by a processor, the instructions cause the processor to perform operations including defining at least a portion of a storage system as a data storage space. A rate limit is assigned to the data storage space, thus defining a default rate limit. Operations performed on objects within the data storage space are compared to determine if the default rate limit is exceeded. If the default rate limit is exceeded, one or more remedial actions are implemented concerning the operations performed on objects within the data storage space.

One or more of the following features may be included. The default rate limit may define one or more of: a maximum number of objects per unit time; and a maximum quantity of data per unit time. The remedial action may include one or more of: stopping an operation that exceeds the default rate limit; requesting user confirmation concerning the operation that exceeds the default rate limit; requesting supervisor authorization concerning the operation that exceeds the default rate limit; and slowing the operation that exceeds the default rate limit. Comparing operations performed on objects within the data storage space to the default rate limit to determine if the default rate limit is exceeded may include comparing a plurality of discrete operations performed on objects within the data storage space to the default rate limit to determine if the default rate limit is exceeded. The operations performed on objects within the data storage space may include one or more of: data object deletion operations; data object migration operations; data object modification operations; data object creation operations; data object copying operations; and data object archiving operations. A user of the data storage space may be enabled to override the default rate limit, thus defining an overridden rate limit. The default rate limit may be reestablished after a defined period of time.

In another implementation, a computing system including a processor and memory is configured to perform operations including defining at least a portion of a storage system as a data storage space. A rate limit is assigned to the data storage space, thus defining a default rate limit. Operations performed on objects within the data storage space are compared to determine if the default rate limit is exceeded. If the default rate limit is exceeded, one or more remedial actions are implemented concerning the operations performed on objects within the data storage space.

One or more of the following features may be included. The default rate limit may define one or more of: a maximum number of objects per unit time; and a maximum quantity of data per unit time. The remedial action may include one or more of: stopping an operation that exceeds the default rate limit; requesting user confirmation concerning the operation that exceeds the default rate limit; requesting supervisor authorization concerning the operation that exceeds the default rate limit; and slowing the operation that exceeds the default rate limit. Comparing operations performed on objects within the data storage space to the default rate limit to determine if the default rate limit is exceeded may include comparing a plurality of discrete operations performed on objects within the data storage space to the default rate limit to determine if the default rate limit is exceeded. The operations performed on objects within the data storage space may include one or more of: data object deletion operations; data object migration operations; data object modification operations; data object creation operations; data object copying operations; and data object archiving operations. A user of the data storage space may be enabled to override the default rate limit, thus defining an overridden rate limit. The default rate limit may be reestablished after a defined period of time.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
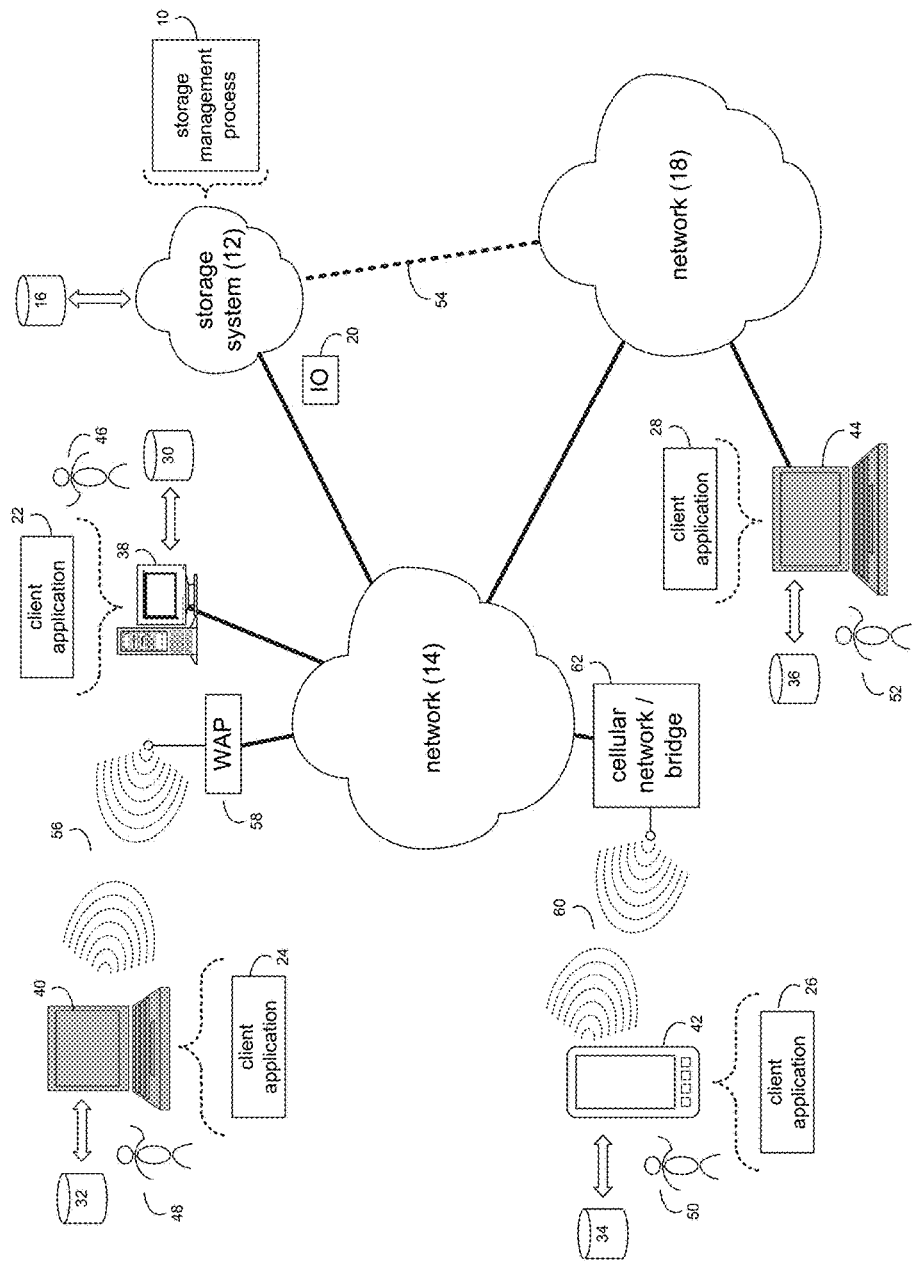
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix™, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
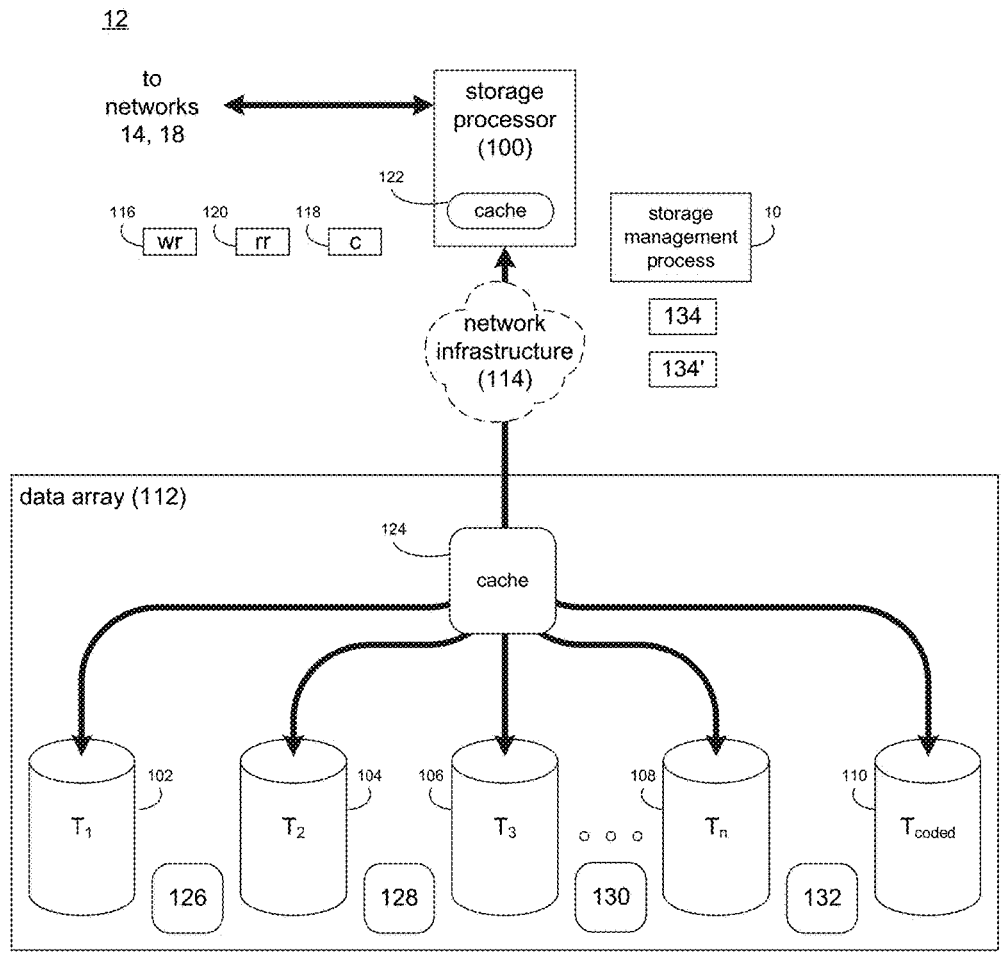
FIG. 2 is a diagrammatic view of the storage system of FIG. 1.

Referring also to FIG. 2, storage system 12 may include storage processor 100 and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

During operation of storage processor 100, content 118 to be written to storage system 12 may be received by storage processor 100. Additionally/alternatively and when storage processor 100 is configured as an application server, content 118 to be written to storage system 12 may be internally generated by storage processor 100.

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

Additionally, assume that data array 112 defines and exposes Logical Units (e.g., LUN 126, 128, 130, 132) that may allow for the storage of data within data array 112.

The Storage Management Process:

As will be discussed below in greater detail, storage management process 10 may be configured to implement procedures/rules that reduce the risk of accidental deletion of objects within storage system 12. Examples of such objects may include but are not limited to data files, domain specific objects, data folders, data directories, LUNs, etc.

Assume for illustrative purposes that user 46 is working on a project that requires user 46 to manipulate data (e.g., add data, delete data and/or modify data) within storage system 12. Accordingly user 46 may access storage system 12 via client application 22 and personal computer 38. Further assume that user 52 is a supervisor of user 46 and, therefore, user 52 may access storage system 12 via client application 28 and notebook computer 44.

Figure 3:
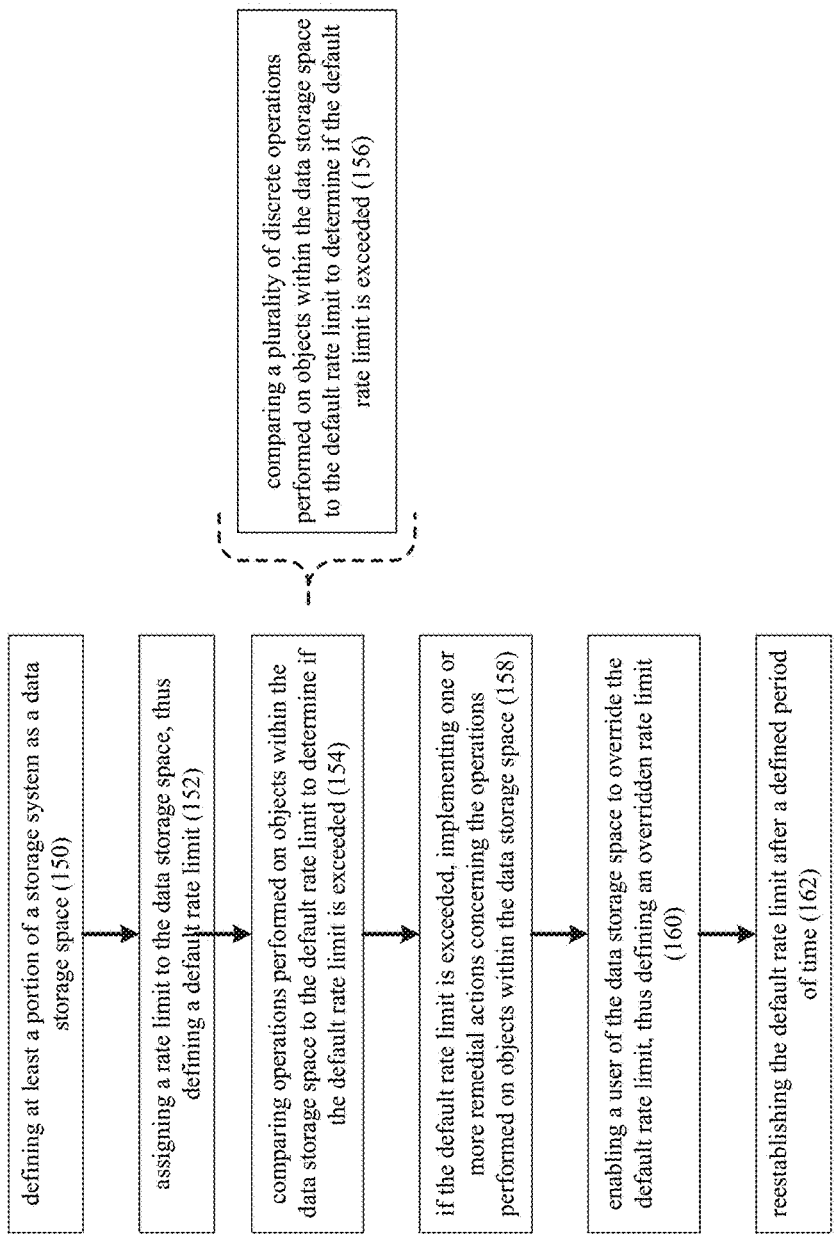
FIG. 3 is a flow chart of the storage management process of FIG. 1.

Referring also to FIG. 3, assume that storage management process 10 defines 150 at least a portion of storage system 12 as a data storage space. As discussed above, assume that storage management process 10 defines 150 LUNs 126, 128, 130, 132 for (in this example) user 46 so that user 46 may work on their project. LUNs 126, 128, 130, 132 may or may not be accessible buy other users (e.g., users 48, 50) of storage system 10. However, LUNs 126, 128, 130, 132 may be accessible user 52, as user 52 is the supervisor of user 46.

Storage management process 10 may assign 152 a rate limit to this data storage space (e.g., LUNs 126, 128, 130, 132), thus defining default rate limit 134. As will be discussed below in greater detail, default rate limit 134 may be assigned 152 by storage management process 10 in order to reduce the risk of accidental deletion of objects, such as data files (examples of which may include but are not limited to e.g., documents, spreadsheets, emails, and database records), domain specific objects (an example of which may include but is not limited to e.g., a movie), data folders, data directories, LUNs, etc. within storage system 12. Default rate limit 134 may define one or more of: a maximum number of objects per unit time; and a maximum quantity of data per unit time. Specifically, default rate limit 134 may define the maximum number of objects (e.g., data files, data folders, data directories and/or LUNs) that e.g., user 46 may delete per unit time (e.g., per minute, per hour, per day and/or per week). Additionally/alternatively, default rate limit 134 may define the maximum quantity of data (e.g., in megabytes, in gigabytes and/or terabytes) that e.g., user 46 may delete per unit time (e.g., per minute, per hour, per day and/or per week). Further, default rate 134 may be static or dynamic (e.g., formulaic). For example, default rate limit 134 may be defined as a formula (e.g., the maximum number of files that can be deleted is no more than 110% of the average number of files deleted the previous week).

Assume for illustrative purposes that (for this example) default rate limit 134 assigned 152 by storage management process 10 is a 1,000 files per hour maximum deletion rate for user 46 with respect to e.g., LUNs 126, 128, 130, 132. While default rate limit 134 is defined in this example as being for user 46 and concerning e.g., LUNs 126, 128, 130, 132, this is for illustrative purposes only and is not intended to be a limitation of this disclosure, as other configurations are possible and are considered to be within the scope of this disclosure.

For example, default rate limit 134 may be broad-based and may apply to all users of storage system 12, wherein every user of storage system 12 may have the same default rate limit. Alternatively, default rate limit 134 may be configured so that it is assigned to a group of users of storage system 12, wherein e.g., senior administrators of storage system 12 may have a high default rate limit, junior administrators of storage system 12 may have a medium default rate limit, and users of storage system 12 may have a low default rate limit. Further, default rate limit 134 may be broad-based and may apply to all storage spaces within storage system 12, as opposed to only (in this example) LUNs 126, 128, 130, 132. Additionally, while the following discussion concerns the process of setting a default rate limit for storage system 12, it is understood and considered to be within the scope of this disclosure the process of setting multiple discrete rate limits for storage system 12, wherein storage management process 10 may assign 152 a first rate limit for one type of operation (e.g., object creation), may assign 152 a second rate for another type of operation (e.g., object deletion) and may assign a third rate limit for third type of operation (e.g., object modifications)

While in this particular example, default rate limit 134 is assigned 152 by storage management process 10 to be a 1,000 data files per hour maximum deletion rate, default rate limit 134 may be multi-faceted and may additionally define e.g., a maximum quantity of data that (in this example) user 46 may delete per unit time (e.g., per minute, per hour, per day and/or per week). For example, default rate limit 134 may be assigned 152 by storage management process 10 to be a 1,000 data files per hour and/or one terabyte per day maximum deletion rate.

Continuing with the above-stated example in which default rate limit 134 is assigned 152 by storage management process 10 to be a 1,000 data files per hour maximum deletion rate for user 46 with respect to e.g., LUNs 126, 128, 130, 132, storage management process 10 may compare 154 operations performed on objects (e.g., data files, data folders, data directories and/or LUNs) within the data storage space (e.g., LUNs 126, 128, 130, 132) to default rate limit 134 (e.g., a 1,000 files per hour maximum deletion rate) to determine if default rate limit 134 is exceeded.

The operations performed on objects (e.g., data files, data folders, data directories, LUNs, etc.) within the data storage space (e.g., e.g., LUNs 126, 128, 130, 132) may include but is not limited to one or more of: data object deletion operations (e.g., operations that result in the deletion of data); data object migration operations (e.g., operations that result in the movement of data); data object modification operations (e.g., operations that result in the modification of data); data object creation operations (e.g., operations that result in the creation of data); data object copying operations (e.g., operations that result in the copying of data); and data object archiving operations (e.g., operations that result in the archiving of data). Additionally and with respect to domain specific objects, such operations may include the deleting of a scene or a single frame; and the modification of the sequence of frames/scene fragments. As is known in the art, such operations may be fully or partially automated using a script and/or a batch process.

Accordingly, if user 46 selects (for deletion) under 1,000 data files (or one or more data folders/data directories/LUNs that include under 1,000 data files), storage management process 10 may compare 154 the operation (e.g., the deletion of under 1,000 data files) to default rate limit 134 (e.g., a 1,000 data files per hour maximum deletion rate) to determine if default rate limit 134 is exceeded. In this particular example and since default rate limit 134 is not being exceeded, storage management process 10 may allow this operation (e.g., the deletion of under 1,000 data files or one or more data folders/data directories/LUNs that include under 1,000 data files) to proceed.

Conversely, if user 46 selects (for deletion) over 1,000 data files (or one or more data folders/data directories/LUNs that include over 1,000 data files), storage management process 10 may compare 154 the operation (e.g., the deletion of over 1,000 data files) to default rate limit 134 (e.g., a 1,000 data files per hour maximum deletion rate) and determine that default rate limit 134 has been exceeded.

When comparing 154 operations performed on objects (e.g., data files, data folders, data directories, LUNs, etc.) within the data storage space (e.g., e.g., LUNs 126, 128, 130, 132) to default rate limit 134 to determine if default rate limit 134 has been exceeded, storage management process 10 may compare 156 a plurality of discrete operations performed on objects within the data storage space (e.g., e.g., LUNs 126, 128, 130, 132) to default rate limit 134 to determine if default rate limit 134 has been exceeded.

Accordingly, if user 46 first selects (for deletion) 999 data files (or one or more data folders/data directories/LUNs that include 999 data files), storage management process 10 may compare 154 the operation (e.g., the deletion of 999 data files) to default rate limit 134 (e.g., a 1,000 data files per hour maximum deletion rate) and determine that default rate limit 134 has not been exceeded, and storage management process 10 may allow this operation (e.g., the deletion of 999 data files) to proceed.

However, assume that user 46 subsequently selects (for deletion) another 999 data files (or one or more data folders/data directories/LUNs that include 999 data files). Storage management process 10 may compare 156 the plurality of discrete operations (e.g., the sum of the first 999 data file deletions and the second 999 data file deletions) performed on objects within the data storage space (e.g., e.g., LUNs 126, 128, 130, 132) to determine if default rate limit 134 has been exceeded.

Accordingly, if user 46 selected the second batch of 999 data files (or one or more data folders/data directories/LUNs that include 999 data files) e.g., 90 minutes after the deletion of the first batch of 999 data files, storage management process 10 may compare 156 the plurality of discrete operations (e.g., the deletion of the second batch of 999 data files 90 minutes after the first batch of 999 data files) to default rate limit 134 (e.g., a 1,000 data files per hour maximum deletion rate) and determine that default rate limit 134 has not been exceeded, and storage management process 10 may allow this operation (e.g., the deletion of the second batch of 999 data files) to proceed.

Conversely, if user 46 selected the second batch of 999 data files (or one or more data folders/data directories/LUNs that include 999 data files) e.g., 30 minutes after the deletion of the first batch of 999 data files, storage management process 10 may compare 156 the plurality of discrete operations (e.g., the deletion of the second batch of 999 data files 30 minutes after the first batch of 999 data files; for a total of 1,998 data files being deleted within 30 minutes) to default rate limit 134 (e.g., a 1,000 data files per hour maximum deletion rate) and determine that default rate limit 134 has been exceeded.

Concerning the above-described comparisons (e.g., comparisons 154, 156) performed by storage management process 10, these comparisons may be performed prior to the operation being initiated (as described above). Additionally/alternatively, these comparisons may be performed as the operations are occurring, wherein selecting e.g., 1,200 files for deletion will not immediately make the operation fail (as will be described below).

If storage management process 10 determines (when comparing 154 a single operation and/or comparing 156 the cumulative impact of a plurality of discrete operations) that default rate limit 134 has been exceeded, storage management process 10 may implement 158 one or more remedial actions concerning the operations performed on objects within the data storage space (e.g., e.g., LUNs 126, 128, 130, 132).

Examples of these remedial action may include but are not limited to one or more of: stopping an operation that exceeds default rate limit 134; requesting user confirmation concerning the operation that exceeds default rate limit 134; requesting supervisor authorization concerning the operation that exceeds default rate limit 134; and slowing the operation that exceeds default rate limit 134.

Figure 4C:
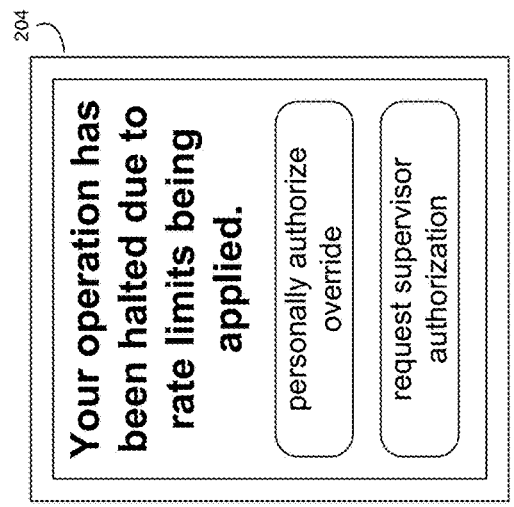
FIGS. 4A-4C are diagrammatic views of messages rendered by the storage management process of FIG. 1.
Figure 4A:
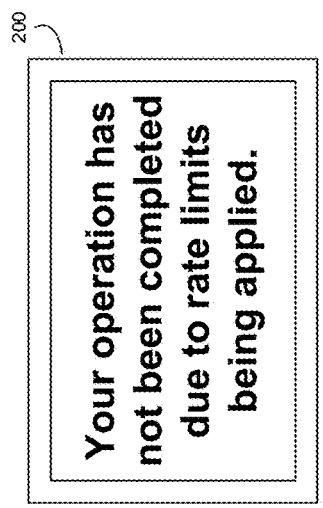

Concerning stopping the operation that exceeds default rate limit 134, if user 46 selects (for deletion) 1,200 data files, storage management process 10 may a) stop the operation prior to any deletions occurring (resulting in no data files being deleted); or b) delete the first 1,000 data files and then stop the operation (resulting in 1,000 of the 1,200 data files being deleted). Storage management process 10 may render message 200 (on personal computer 38) to inform user 46 of the stoppage (as shown in FIG. 4A).

Figure 4B:
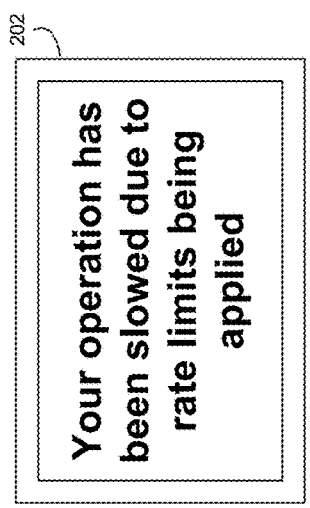

Concerning slowing the operation that exceeds default rate limit 134, if user 46 selects (for deletion) 1,200 data files, storage management process 10 may delete the first 1,000 data files at a normal deletion rate and may then slow down the deletion rate by a defined percentage (e.g., 50%) or to a slower fixed deletion rate so that the remaining 200 data files are deleted but at a slower deletion rate. Storage management process 10 may render message 202 (on personal computer 38) to inform user 46 of the slowdown (as shown in FIG. 4B).

Concerning requesting user confirmation and/or supervisor authorization with respect to the operation that exceeds default rate limit 134, if user 46 selects (for deletion) 1,200 data files, storage management process 10 may enable 160 a user (e.g., user 46 and/or (supervising) user 52) of the data storage space (e.g., e.g., LUNs 126, 128, 130, 132). to override default rate limit 134, thus defining an overridden rate limit (e.g., overridden rate limit 134'). Examples of overridden rate limit 134' may include but are not limited to: a) no limit and b) a multiple of the original limit (e.g., 2× default rate limit 134). Storage management process 10 may render message 204 (on personal computer 38 and/or notebook computer 44) to inform user 46 and/or user 52 that authorization is required (as shown in FIG. 4C).

In the event that default rate limit 134 is overridden, storage management process 10 may implement a delay (e.g., a few minutes) to enable the user to ensure that the deletion operation was intended. Storage management process 10 may be configured to reestablish 162 default rate limit 134 after a defined period of time. Examples of this defined period of time may include but are not limited to: a) immediately and b) one hour/one day/one week later.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages (e.g., the "C" programming language or similar programming languages) and/or scripting languages (e.g. Shell Script, Perl, Java Script, PHP, LUA, Python and Ruby). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    defining at least a portion of a storage system as a data storage space;
    assigning a rate limit to the data storage space, thus defining a default rate limit;
    comparing operations performed on objects within the data storage space to the default rate limit to determine if the default rate limit is exceeded; and
    if the default rate limit is exceeded, implementing one or more remedial actions concerning the operations performed on objects within the data storage space;
    rendering a message, on a user interface of a computing device performing the operations on the objects within the data storage space, describing the one or more remedial actions concerning the operations performed on objects within the data storage space, wherein the message rendered on the user interface includes a request for user authorization to override the default rate limit, thus defining an overridden rate limit.

2. The computer-implemented method of claim 1 wherein the default rate limit defines one or more of:
   a maximum number of objects per unit time; and
   a maximum quantity of data per unit time.

3. The computer-implemented method of claim 1 wherein the remedial action includes one or more of:
   stopping an operation that exceeds the default rate limit;
   requesting supervisor authorization concerning the operation that exceeds the default rate limit; and
   slowing the operation that exceeds the default rate limit.

4. The computer-implemented method of claim 1 wherein comparing operations performed on objects within the data storage space to the default rate limit to determine if the default rate limit is exceeded includes:
   comparing a plurality of discrete operations performed on objects within the data storage space to the default rate limit to determine if the default rate limit is exceeded.

5. The computer-implemented method of claim 1 wherein the operations performed on objects within the data storage space include one or more of:
   data object deletion operations;
   data object migration operations;
   data object modification operations;
   data object creation operations;
   data object copying operations; and
   data object archiving operations.

6. The computer-implemented method of claim 1 further comprising:
   reestablishing the default rate limit after a defined period of time.

7. The computer-implemented method of claim 1 wherein the message on the user interface including the request for user authorization to override the default rate limit includes a button selectable by a user to override the default rate limit.

8. A computer program product residing on a non-transitory computer readable medium having a plurality of instructions stored thereon which, when executed by a processor, cause the processor to perform operations comprising:
   defining at least a portion of a storage system as a data storage space;
   assigning a rate limit to the data storage space, thus defining a default rate limit;
   comparing operations performed on objects within the data storage space to the default rate limit to determine if the default rate limit is exceeded; and
   if the default rate limit is exceeded, implementing one or more remedial actions concerning the operations performed on objects within the data storage space;
   rendering a message, on a user interface of a computing device performing the operations on the objects within the data storage space, describing the one or more remedial actions concerning the operations performed on objects within the data storage space, wherein the message rendered on the user interface includes a request for user authorization to override the default rate limit, thus defining an overridden rate limit.

9. The computer program product of claim 8 wherein the default rate limit defines one or more of:
   a maximum number of objects per unit time; and
   a maximum quantity of data per unit time.

10. The computer program product of claim 8 wherein the remedial action includes one or more of:
   stopping an operation that exceeds the default rate limit;
   requesting supervisor authorization concerning the operation that exceeds the default rate limit; and
   slowing the operation that exceeds the default rate limit.

11. The computer program product of claim 8 wherein comparing operations performed on objects within the data storage space to the default rate limit to determine if the default rate limit is exceeded includes:
   comparing a plurality of discrete operations performed on objects within the data storage space to the default rate limit to determine if the default rate limit is exceeded.

12. The computer program product of claim 8 wherein the operations performed on objects within the data storage space include one or more of:
   data object deletion operations;
   data object migration operations;
   data object modification operations;
   data object creation operations;
   data object copying operations; and
   data object archiving operations.

13. The computer program product of claim 8 further comprising instructions for:
   reestablishing the default rate limit after a defined period of time.

14. The computer program product of claim 8 wherein the message on the user interface including the request for user authorization to override the default rate limit includes a button selectable by a user to override the default rate limit.

15. A computing system including a processor and memory configured to perform operations comprising:
   defining at least a portion of a storage system as a data storage space;
   assigning a rate limit to the data storage space, thus defining a default rate limit;
   comparing operations performed on objects within the data storage space to the default rate limit to determine if the default rate limit is exceeded; and
   if the default rate limit is exceeded, implementing one or more remedial actions concerning the operations performed on objects within the data storage space;
   rendering a message, on a user interface of a computing device performing the operations on the objects within the data storage space, describing the one or more remedial actions concerning the operations performed on objects within the data storage space, wherein the message rendered on the user interface includes a request for user authorization to override the default rate limit, thus defining an overridden rate limit.

16. The computing system of claim 15 wherein the default rate limit defines one or more of:
   a maximum number of objects per unit time; and
   a maximum quantity of data per unit time.

17. The computing system of claim 15 wherein the remedial action includes one or more of:
   stopping an operation that exceeds the default rate limit;
   requesting supervisor authorization concerning the operation that exceeds the default rate limit; and
   slowing the operation that exceeds the default rate limit.

18. The computing system of claim 15 wherein comparing operations performed on objects within the data storage space to the default rate limit to determine if the default rate limit is exceeded includes:
   comparing a plurality of discrete operations performed on objects within the data storage space to the default rate limit to determine if the default rate limit is exceeded.

19. The computing system of claim 15 wherein the operations performed on objects within the data storage space include one or more of:
   data object deletion operations;
   data object migration operations;
   data object modification operations;

data object creation operations;
data object copying operations; and
data object archiving operations.

20. The computing system of claim 15 further configured to perform operations comprising:
reestablishing the default rate limit after a defined period of time.

21. The computing system of claim 15 wherein the message on the user interface including the request for user authorization to override the default rate limit includes a button selectable by a user to override the default rate limit.

\* \* \* \* \*